US008600691B2

(12) United States Patent
Griffith et al.

(10) Patent No.: US 8,600,691 B2
(45) Date of Patent: Dec. 3, 2013

(54) GYROSCOPE SYSTEM MAGNETIC FIELD ERROR COMPENSATION

(75) Inventors: Robert C. Griffith, Woodland Hills, CA (US); Michael S. Larsen, Woodland Hills, CA (US); Michael D. Bulatowicz, Canoga Park, CA (US)

(73) Assignee: Northrop Grumman Guidance and Electronics, Inc., Woodland Hills, CA (US)

( * ) Notice: Subject to any disclaimer, the term of this patent is extended or adjusted under 35 U.S.C. 154(b) by 200 days.

(21) Appl. No.: 13/011,530

(22) Filed: Jan. 21, 2011

(65) Prior Publication Data

US 2012/0191396 A1 Jul. 26, 2012

(51) Int. Cl.
*G01C 17/38* (2006.01)
*G01V 3/00* (2006.01)

(52) U.S. Cl.
USPC .......... 702/92; 324/302

(58) Field of Classification Search
USPC .......... 702/92, 1, 81, 84–85, 106, 127, 189; 324/300, 302, 304, 307–309, 313, 319
See application file for complete search history.

(56) References Cited

U.S. PATENT DOCUMENTS 3,103,623 A * 9/1963 Greenwood, Jr. .......... 324/302
3,103,624 A 9/1963 Greenwood, Jr. et al.
3,778,700 A * 12/1973 Bayley et al. .......... 324/304
4,157,495 A 6/1979 Grover et al.
4,403,190 A 9/1983 Greenwood
4,430,616 A 2/1984 Grover
4,461,996 A 7/1984 Kwon
7,282,910 B1 * 10/2007 Kanegsberg .......... 324/304
8,159,220 B2 * 4/2012 Bulatowicz et al. .......... 324/304
2007/0247149 A1 10/2007 Kanegsberg
2009/0033329 A1 2/2009 Stewart et al.
2010/0007345 A1 1/2010 Kanegsberg

FOREIGN PATENT DOCUMENTS

WO WO 81/00455 2/1981
WO WO 2007/099599 A1 9/2007

OTHER PUBLICATIONS

Donley, E.A., Nuclear Magnetic Resonance Gyroscopes, IEEE Sensors 2010 Conference, pp. 17-22.*
International Search Report for corresponding PCT/US12/21429, completed May 14, 2012 by Lee W. Young of ISA/US.

* cited by examiner

*Primary Examiner* — Toan Le
(74) *Attorney, Agent, or Firm* — Tarolli, Sundheim, Covell & Tummino LLP

(57) ABSTRACT

One embodiment of the invention includes a nuclear magnetic resonance (NMR) gyroscope system. The system includes a gyro cell that is sealed to enclose an alkali metal vapor, a first gyromagnetic isotope, and a second gyromagnetic isotope. A magnetic field generator configured to generate a magnetic field that is provided through the gyro cell to cause the first and the second gyromagnetic isotopes to precess. A magnetic field error controller configured to measure an error associated with a magnitude of the magnetic field and to generate an error signal that is fed back to the magnetic field generator to maintain the magnetic field at a desired magnitude. The system further includes a mechanization processor configured to calculate a rotation angle about a sensitive axis of the NMR gyroscope system based on a measured precession angle of at least one of the first and second gyromagnetic isotopes and the error signal.

20 Claims, 3 Drawing Sheets

GYROSCOPE SYSTEM MAGNETIC FIELD ERROR COMPENSATION

TECHNICAL FIELD

The present invention relates generally to gyroscope systems, and specifically to gyroscope system magnetic field error compensation.

BACKGROUND

A typical nuclear magnetic resonance (NMR) gyroscope operates on the principle of sensing inertial angular rotation rate or orientation angle about a sensitive axis based on a shift in the measured Larmor precession frequency or phase of one or two isotopes that possess nuclear magnetic moments. An NMR gyroscope ("gyro") system can include a gyro cell and a rotation sensor that includes, for example, a light source, a photodetector, and signal processing circuitry. As an example, the gyro cell can contain one or more alkali metal vapors, such as Rubidium, together with one or more gyromagnetic isotopes that are caused to precess in response to a magnetic field. The signal processing circuitry can extract the Larmor precession frequency and/or phase information of the one or more gyromagnetic isotopes. As a result, a gyroscope rotation rate or orientation angle about the sensitive axis can be calculated based on the extracted Larmor precession frequencies and phase information.

SUMMARY

One embodiment of the invention includes a nuclear magnetic resonance (NMR) gyroscope system. The system includes a gyro cell that is sealed to enclose an alkali metal vapor, a first gyromagnetic isotope, and a second gyromagnetic isotope. A magnetic field generator configured to generate a magnetic field that is provided through the gyro cell to cause the first and the second gyromagnetic isotopes to precess. A magnetic field error controller configured to measure an error associated with a magnitude of the magnetic field and to generate an error signal that is fed back to the magnetic field generator to maintain the magnetic field at a desired magnitude. The system further includes a mechanization processor configured to calculate a rotation angle about a sensitive axis of the NMR gyroscope system based on a measured precession angle of at least one of the first and second gyromagnetic isotopes and the error signal.

Another embodiment of the invention includes a method for substantially reducing magnetic field errors in a nuclear magnetic resonance (NMR) gyroscope system. The method includes providing a magnetic field through a sealed gyro cell to cause a first gyromagnetic isotope and a second gyromagnetic isotope to precess. The method also includes measuring an error associated with a magnitude of the magnetic field based on a difference between one of a sum and a difference of precession frequencies associated with the first and second gyromagnetic isotopes and a reference frequency and generating an error signal corresponding to the measured error. The method also includes controlling a magnitude of the magnetic field in response to the error signal and measuring a precession angle of at least one of the first and second gyromagnetic isotopes. The method further includes calculating a rotation angle about a sensitive axis of the NMR gyroscope system based on the measured precession angle and the error signal.

Another embodiment of the invention includes a three-axis nuclear magnetic resonance (NMR) gyroscope system comprising a plurality of gyro cell systems. Each of the gyro cell systems includes a gyro cell that is sealed to enclose an alkali metal vapor, a first gyromagnetic isotope, and a second gyromagnetic isotope. Each system also includes a magnetic field generator configured to generate a magnetic field that is provided through the gyro cell to cause the first and the second gyromagnetic isotopes to precess. Each system also includes a magnetic field error controller configured to measure an error associated with a magnitude of the magnetic field based on a difference between a sum of precession frequencies associated with the first and second gyromagnetic isotopes and a reference frequency and to generate an error signal that is fed back to the magnetic field generator to maintain the magnetic field at a desired magnitude. Each system further includes a mechanization processor configured to calculate a rotation angle about a sensitive axis of the NMR gyroscope system based on subtracting from a measured precession angle of at least one of the first and second gyromagnetic isotopes an error angle represented by the error signal.

DETAILED DESCRIPTION

The present invention relates generally to gyroscope systems, and specifically to gyroscope system magnetic field error compensation. The gyroscope ("gyro") system can be a nuclear magnetic resonance (NMR) gyroscope system that includes a gyro cell having alkali metal particles and at least two gyromagnetic isotopes. The system measures the precession frequencies of two or more gyromagnetic isotopes, such as Xenon (e.g., $^{129}$Xe or $^{131}$Xe), that precess in response to a substantially uniform magnetic field. The sum of the precession frequencies of the two gyromagnetic isotopes is compared with a reference frequency, such as generated from a local oscillator. A magnetic field error controller generates an error signal having a magnitude based on the difference in frequency or phase between the sum of the precession frequencies and the reference frequency. The magnitude of the substantially uniform magnetic field is controlled in a feedback manner based on the comparison. A mechanization processor can calculate a rotation angle of the gyro system based on a precession frequency or phase angle of one or both of the gyromagnetic isotopes.

The adjustment of the substantially uniform magnetic field can take time, which can result in errors in the angular measurement of the rotation of the gyroscope cell prior to full correction of the magnetic field. Thus, the mechanization processor can calculate a correction to the rotation angle of the gyro cell based on the error signal. As an example, the error signal can be a voltage signal having a magnitude that varies linearly with a phase or frequency difference between the sum of the frequencies of the two gyromagnetic isotopes and the reference frequency. As another example, the error signal can be an average phase or frequency difference of a plurality of phase or frequency difference samples that correspond to a phase angle or frequency sample of the slowest precessing gyromagnetic isotope. Therefore, the error signal is implemented by the mechanization processor to subtract the known error from the angular measurement of the rotation of the gyroscope.

Figure 1:
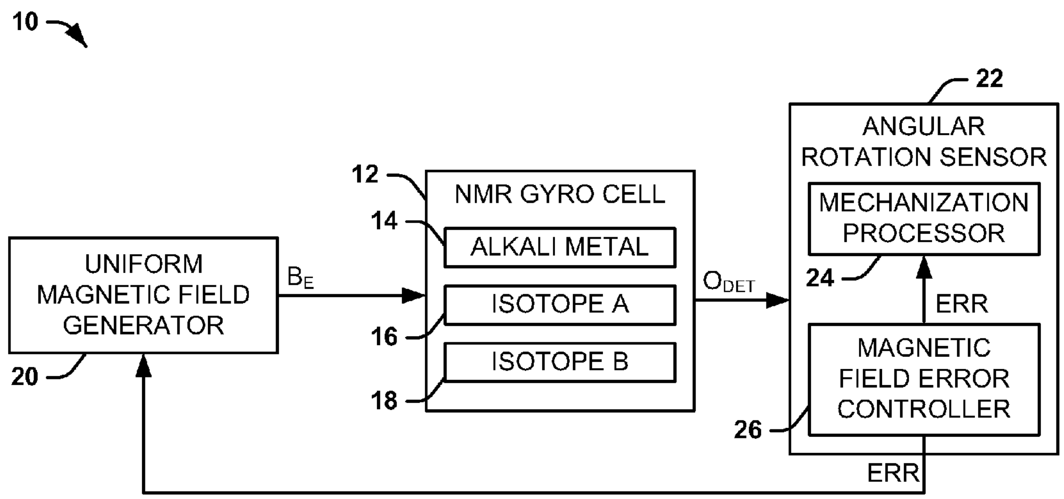
FIG. 1 illustrates an example of a nuclear magnetic resonance (NMR) gyro system in accordance with an aspect of the invention.

FIG. 1 illustrates an example of a nuclear magnetic resonance (NMR) gyro system 10 in accordance with an aspect of the invention. The NMR gyro system 10 can be implemented in any of a variety of applications. As an example, the NMR gyro system 10 can be implemented in navigation systems for aircraft and/or spacecraft. In addition, the NMR gyro system 10 can be a portion of a multi-axis gyro system, such as demonstrated in greater detail in the example of FIG. 3.

The NMR gyro system 10 includes an NMR gyro cell 12 that can be, for example, a glass casing of any of a variety of shapes and sizes. The NMR gyro cell 12 includes an alkali metal 14, as well as a first gyromagnetic isotope 16 and a second gyromagnetic isotope 18, demonstrated in the example of FIG. 1 as ISOTOPE A and ISOTOPE B, respectively. As an example, the alkali metal 14 can be Rubidium (Rb) or Cesium (Cs) vapor, and the gyromagnetic isotopes 16 and 18 can include noble gas isotopes such as $^{3}$Helium, $^{83}$Krypton, $^{129}$Xenon, and/or $^{131}$Xenon. The NMR gyro system 10 also includes one or more magnetic field generators 20 that are configured to generate a substantially uniform magnetic field $B_E$ through the NMR gyro cell 12. As an example, the magnetic field generator 20 can be configured as a magnetic solenoid that substantially surrounds the NMR gyro cell 12.

In response to the substantially uniform magnetic field $B_E$, and to a stimulus magnetic field (not shown), the gyromagnetic isotopes 16 and 18 precess relative to an axis of the NMR gyro cell 12. As an example, the gyromagnetic isotopes 16 and 18 can be selected such that the first gyromagnetic isotope 16 precesses in a first rotation direction and the second gyromagnetic isotope 18 precesses in the opposite rotation direction. As a result, a sum of the frequencies of the gyromagnetic isotopes 16 and 18 is substantially unaffected by rotation of the NMR gyro cell 12, as the rotation of the NMR gyro system 10 is added to the apparent precession of one of the gyromagnetic isotopes 16 and subtracted from the apparent precession of the other of the gyromagnetic isotopes 18 by a substantially equal amount, such as described in co-pending application Ser. No. 12/534,641, the content of which being incorporated herein by reference. As another example, the gyromagnetic isotopes 16 and 18 can be selected such that the first and second gyromagnetic isotopes 16 and 18 precess in the same rotation direction, such that a difference of the frequencies of the gyromagnetic isotopes 16 and 18 is substantially unaffected by rotation of the NMR gyro system 10. In addition, each of the gyromagnetic isotopes 16 and 18 can precess at a unique frequency relative to the other of the gyromagnetic isotopes 16 and 18 in response to the substantially uniform magnetic field $B_E$ and can also change precession frequencies by different amounts relative to changes in the substantially uniform magnetic field $B_E$. In addition, the NMR gyro system 10 can include a magnetic shield (not shown) that can substantially surround the NMR gyro cell 12, thus substantially mitigating interference from external magnetic fields, such as from the Earth magnetic field.

The NMR gyro system 10 further includes an angular rotation sensor 22. The angular rotation sensor 22 can be configured to measure a precession angle of at least one of the gyromagnetic isotopes 16 and 18 to calculate a rotation angle about a sensitive axis of the NMR gyro system 10 over the time duration based on the measured precession angles. As an example, the angular rotation sensor 22 can be configured to optically pump the alkali metal 14 in the NMR gyro cell 12 with an optical pump beam to align the spin of the alkali metal 14 with the substantially uniform magnetic field $B_E$. In response, due to a spin-exchange process, the gyromagnetic isotopes 16 and 18 are also spin-aligned to the optical pump beam. The NMR gyro system 10 can include a probe beam source (not shown) that is configured to generate a probe beam that passes through the NMR gyro cell 12. The probe beam can exit the NMR gyro cell 12 as a detection beam $O_{DET}$, such as with a directional component normal to the optical pump beam. The alignment of the alkali metal 14 resulting from the optical pump beam can modulate the probe beam to generate the detection beam $O_{DET}$. Specifically, the modulation of the detection beam $O_{DET}$ can be a function of the precession of the alkali metal 14 as modified by the precession of the gyromagnetic isotopes 16 and 18. As an example, the angular rotation sensor 22 can include one or more photodetectors configured to detect the modulation of the detection beam $O_{DET}$. Accordingly, changes in the precession angles of the alkali metal 14 and the gyromagnetic isotopes 16 and 18, as detected in the modulated optical detection signal $O_{DET}$, can be processed to determine changes in the orientation about the sensitive axis that correspond to rotational motion.

In the example of FIG. 1, the angular rotation sensor 22 includes a mechanization processor 24. The mechanization processor 24 can be configured to calculate the rotation angle about the sensitive axis based on the measured precession angle of the at least one of the gyromagnetic isotopes 16 and 18. As an example, the mechanization processor 24 can be configured to calculate the rotation angle about the sensitive axis of the NMR gyro cell 12 based on the measured precession angle of one of the gyromagnetic isotopes 16 and 18 that is indicated by the optical detection signal $O_{DET}$. Specifically, the detected precession angle of the one of the gyromagnetic isotopes 16 and 18 can be compared to a reference signal corresponding to an expected precession angle of the one of the gyromagnetic isotopes 16 and 18 in the substantially uniform magnetic field $B_E$. Thus, the rotation of the NMR gyro cell 12 can be calculated from a difference between the measured precession angle of the one of the gyromagnetic isotopes 16 and 18 and the reference signal.

As described above, the precession frequencies of the gyromagnetic isotopes 16 and 18 can change different amounts relative to changes in the substantially uniform magnetic field $B_E$. As an example, transient variations can occur in the substantially uniform magnetic field $B_E$, such as from sources external to the NMR gyro system 10. Thus, the angular rotation sensor 22 includes a magnetic field error controller 26 that is configured to generate an error signal ERR that is provided as a feedback signal to the magnetic field generator(s) 20 to maintain the substantially uniform magnetic field $B_E$ at a desired magnitude.

For example, the magnetic field error controller 26 can be configured to compare a sum of the precession frequencies of the gyromagnetic isotopes 16 and 18 with a reference frequency, such as generated by a crystal oscillator (not shown) to measure error in the substantially uniform magnetic field $B_E$. The reference frequency can correspond to an expected frequency of the sum of the precession frequencies of the gyromagnetic isotopes 16 and 18 in the presence of the substantially uniform magnetic field $B_E$. Thus, because the sum of the precession frequencies of the gyromagnetic isotopes 16 and 18 is unaffected by rotation of the NMR gyro system 10 based on the opposite precession of the gyromagnetic isotopes 16 and 18 in the presence of the substantially uniform magnetic field $B_E$, the difference in the reference frequency and the sum of the precession frequencies of the gyromagnetic isotopes 16 and 18 directly correlates to an error magnitude of the substantially uniform magnetic field $B_E$. As a result, the magnetic field generator(s) 20 can adjust the magnitude of the substantially uniform magnetic field $B_E$ based on the error signal ERR to compensate for the detected field error.

Upon the magnetic field error controller 26 detecting a deviation in the magnitude of the substantially uniform magnetic field $B_E$, but prior to the magnetic field generator 20 correcting the magnitude of the substantially uniform magnetic field $B_E$ via the error signal ERR, the angular rotation sensor 22 may continue to measure the rotation of the NMR gyro system 10. As a result, the measurement of the rotation of the NMR gyro system 10 may include errors based on the error in the magnitude of the substantially uniform magnetic field $B_E$. Therefore, in the example of FIG. 1, the magnetic field error controller 26 is further configured to provide the error signal ERR to the mechanization processor 24, such that the mechanization processor 24 can be configured to calculate the apparent rotation angle of the NMR gyro system 10 based on the error signal ERR. As a result, the mechanization processor 24 can substantially cancel the error in the magnitude of the substantially uniform magnetic field $B_E$ from the calculation of the rotation angle of the NMR gyro system 10. As an example, the error signal ERR can include phase error information associated with one or both of the first and second gyromagnetic isotopes 16 and 18. Therefore, the mechanization processor 24 can subtract the known phase angle error in one of the gyromagnetic isotopes 16 and 18 from the rotation angle of the NMR gyro system 10. Accordingly, the NMR gyro system 10 can provide a more accurate rotation angle measurement of the NMR gyro system 10 than typical gyroscope systems.

It is to be understood that the NMR gyro system 10 is not intended to be limited to the example of FIG. 1. As an example, the NMR gyro cell 12 can include additional gyromagnetic isotopes beyond the first and second gyromagnetic isotopes 16 and 18, such as a total of three gyromagnetic isotopes. In addition, it is to be understood that the NMR gyro system 10 is demonstrated in the example of FIG. 1 simplistically for the sake of brevity, such that additional components can be included in the NMR gyro system 10. Accordingly, the NMR gyro system 10 can be configured in a variety of ways.

Figure 2:
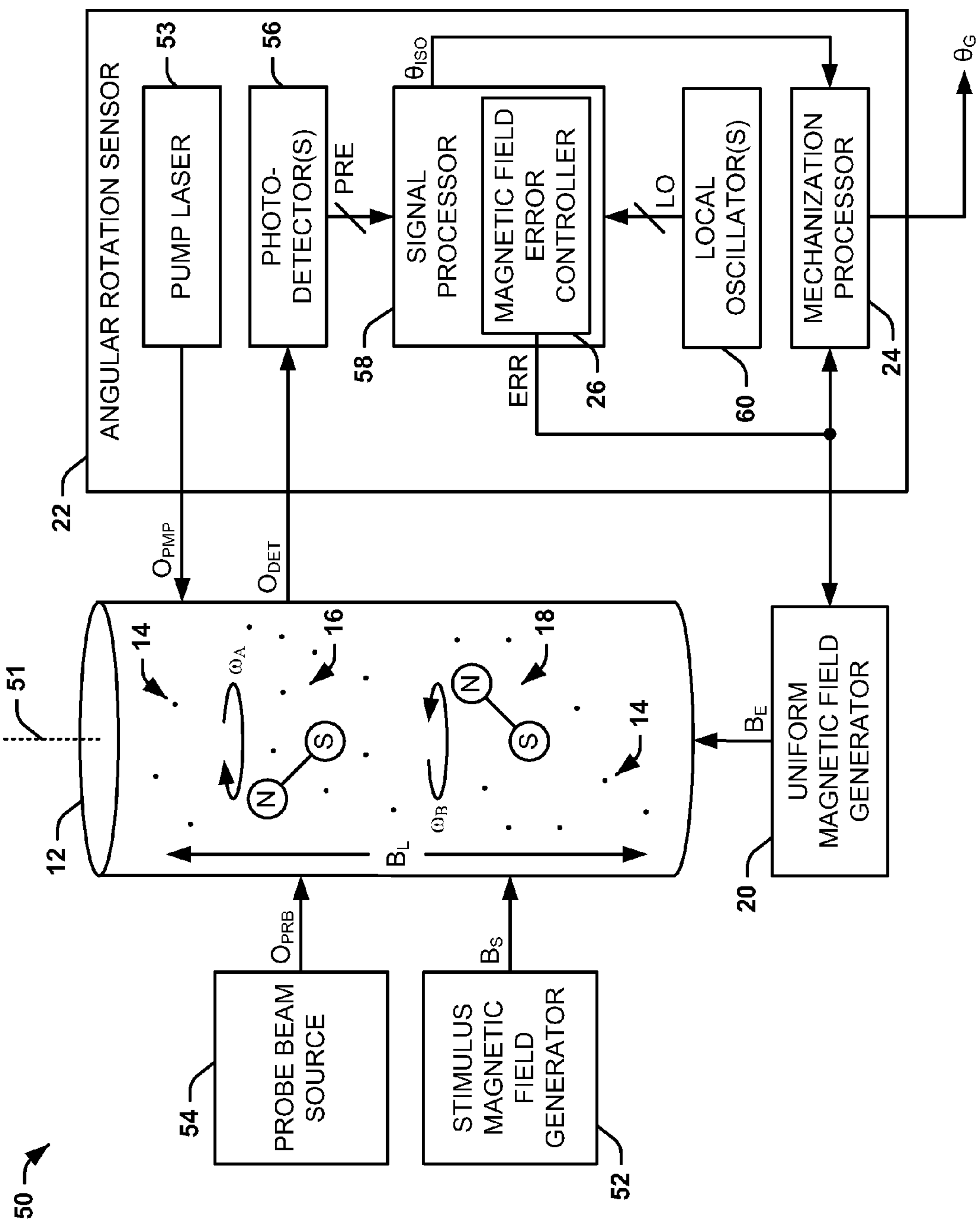
FIG. 2 illustrates another example of an NMR gyro system in accordance with an aspect of the invention.

FIG. 2 illustrates another example of an NMR gyro system 50 in accordance with an aspect of the invention. The NMR gyro system 50 can be configured substantially similar to the NMR gyro system 10 in the example of FIG. 1. Specifically, the NMR gyro system 50 can be configured to measure a rotation angle $\theta_G$ about a sensitive axis 51. Thus, the NMR gyro system 50 can be implemented in navigation systems for aircraft and/or spacecraft, and/or as part of a multi-axis gyro system, similar to as described in the example of FIG. 1 above. Therefore, like reference numbers are used in the example of FIG. 2 as those used in the example of FIG. 1.

The NMR gyro system 50 includes the NMR gyro cell 12. In the example of FIG. 2, the NMR gyro cell 12 is demonstrated as cylindrical. However, it is to be understood that the NMR gyro cell 12 can be any of a variety of shapes, such as cubical or spherical. The NMR gyro cell 12 includes the alkali metal 14, demonstrated in the example of FIG. 2 as a vapor residing within the NMR gyro cell 12. The NMR gyro cell 12 also includes the first gyromagnetic isotope 16 and the second gyromagnetic isotope 18, demonstrated diagrammatically in the example of FIG. 2. The NMR gyro system 50 also includes the magnetic field generator 20 that generates the substantially uniform magnetic field $B_E$ through the NMR gyro cell 12 in a direction that is substantially parallel with the sensitive axis 51. Similar to the description above in the example of FIG. 1, the magnetic field generator 20 can be configured as a magnetic solenoid that substantially surrounds the NMR gyro cell 12. In addition, the NMR gyro system includes a stimulus magnetic field generator 52 configured to generate a stimulus magnetic field $B_S$ in a direction that is substantially perpendicular to the substantially uniform magnetic field $B_E$.

In response to the substantially uniform magnetic field $B_E$ and the stimulus field $B_S$, the gyromagnetic isotopes 16 and 18 precess about the sensitive axis 51. In the example of FIG. 2, the first gyromagnetic isotope 16 precesses in a clockwise direction relative to the top of the NMR gyro cell 12 at a frequency of $\omega_A$. The second gyromagnetic isotope 18 precesses in a counter-clockwise direction relative to the top of the NMR gyro cell 12 at a frequency of $\omega_B$. The frequencies $\omega_A$ and $\omega_B$ of precession can have individual and unequal magnitudes in response to the substantially uniform magnetic field $B_E$ and can change magnitudes by different amounts relative to changes in the substantially uniform magnetic field $B_E$.

In addition to the substantially uniform magnetic field $B_E$, the gyromagnetic isotopes 16 and 18 are also subject to a local magnetic field $B_L$ within the NMR gyro cell 12. The local magnetic field $B_L$ can result from an interaction of the gyromagnetic isotopes 16 and 18 with the alkali metal 14. Specifically, the alkali metal 14 is optically pumped by an optical pump beam $O_{PMP}$ to align the alkali metal 14 and the precessing gyromagnetic isotopes 16 and 18 with the substantially uniform magnetic field $B_E$ in a spin-exchange process. This spin-exchange process thus creates the local magnetic field $B_L$, as explained in greater detail below, that is substantially parallel with the substantially uniform magnetic field $B_E$, and thus the sensitive axis 51. As an example, the local magnetic field $B_L$ can have a direction that is the same or opposite the substantially uniform magnetic field $B_E$ depending on the polarization direction of the optical pump beam $O_{PMP}$. The local magnetic field $B_L$ can have a net effect on the precession frequencies $\omega_A$ and $\omega_B$ in different ways for the respective gyromagnetic isotopes 16 and 18. Specifically, the masses of the gyromagnetic isotopes 16 and 18 are determinative of the effect of the local magnetic field $B_L$ on each of the respective gyromagnetic isotopes 16 and 18. The different masses of the gyromagnetic isotopes 16 and 18 can cause a reduced mass shift in the coupling between the alkali metal particles 14 and the gyromagnetic isotopes 16 and 18 while bound to each other in short lived molecules. Therefore, the gyromagnetic isotopes 16 and 18 can experience different magnetic moments.

In addition to the effect of isotope mass of the gyromagnetic isotopes 16 and 18, the character of the respective magnetic fields produced by the net spin (e.g., dipole, quadrupole, etc.) of the gyromagnetic isotopes 16 and 18 plays a role in the net magnetic moment experienced by the respective gyromagnetic isotopes 16 and 18. For example, $^{129}$Xe has a dipolar magnetic moment, while $^{131}$Xe can have a dipolar, quadrupolar, and octopolar magnetic moment. As a result, the effect of the local magnetic field $B_L$ on the precession frequency of $^{129}$Xe can be significantly different from the effect on $^{131}$Xe.

The NMR gyro system 50 further includes the angular rotation sensor 22. The angular rotation sensor 22 includes a pump laser 53 that is configured to generate the optical pump beam $O_{PMP}$. As an example, the optical pump beam $O_{PMP}$ can be circularly polarized light. Although the example of FIG. 2 demonstrates that the optical pump beam $O_{PMP}$ is provided to the NMR gyro cell 12 at a transverse direction relative to the sensitive axis 51, it is to be understood that the optical pump beam $O_{PMP}$ can be provided at a variety of orientations, such as substantially parallel to the sensitive axis 51. The optical pump beam $O_{PMP}$ is provided to the NMR gyro cell 12 to optically pump the alkali metal 14 in the NMR gyro cell 12 to align the spin of the alkali metal 14 with the substantially uniform magnetic field $B_E$. In response, due to a spin-exchange process, the gyromagnetic isotopes 16 and 18 are also spin-aligned to the optical pump beam $O_{PMP}$.

As an example, once pumped by the optical pump beam $O_{PMP}$, the atoms that constitute the alkali metal 14 may rapidly lose a respective electron polarization, thus becoming substantially randomly oriented. The random orientation can occur, for example, as a result of collisions with other atoms, collisions with atoms that are not aligned with the substantially uniform magnetic field $B_E$, and/or collisions with other atoms that are aligned with the substantially uniform magnetic field $B_E$, such as based on a Cs—Xe spin-exchange collision process. Once the alkali metal 14 reaches a specific state and energy level as a result of interaction with the pump beam $O_{PMP}$, the alkali metal 14 experiences a force aligning it to the substantially uniform magnetic field $B_E$. In the absence of any magnetic fields transverse to the sensitive axis 51, such as can be mitigated by an associated magnetic shield (not shown in the example of FIG. 2), the spin exchange optically pumped gyromagnetic isotopes 16 and 18, such as Xe, may not precess. However, a magnetic field transverse to the sensitive axis 51 is applied at the resonant Larmor frequency of the gyromagnetic isotopes 16 and 18, thus causing the gyromagnetic isotopes 16 and 18 to precess about the sensitive axis 51. As a result, a net torque can act on the spin of the gyromagnetic isotopes 16 and 18 that, in the example of an oscillating transverse field, can be in resonance with a respective natural Larmor frequency, thus causing the spin-aligned atoms of each of the gyromagnetic isotopes 16 and 18 to precess in phase. The magnitude of the torque on the electron spin of a fully pumped atom of the alkali metal 14 can be a function of the angle between a magnetic moment of the respective pumped atom and the substantially uniform magnetic field $B_E$, as well as the magnitude of the stimulus field $B_S$.

Due to the magnitude of the substantially uniform magnetic field $B_E$, the Larmor precession period of one or more of the gyromagnetic isotopes 16 and 18 can be long relative to a time that it takes for the atoms of the alkali metal 14 to return to a less polarized spin state from which they can be re-pumped by the optical pump beam $O_{PMP}$. Therefore, while the optical pump beam $O_{PMP}$ is substantially constantly causing atoms of the alkali metal 14 to become aligned with the substantially uniform magnetic field $B_E$, other previously-aligned atoms of the alkali metal 14 are falling out of alignment with the DC portion of the substantially uniform magnetic field $B_E$. The result of the net effect of the optical pumping of the very large number of atoms of the alkali metal 14 in the NMR gyro cell 12 is the generation of the local magnetic field $B_L$. The local magnetic field $B_L$ is demonstrated in the example of FIG. 2 as being substantially parallel to the substantially uniform magnetic field $B_E$. However, the local magnetic field $B_L$ can also have a second directional component that is substantially parallel to the optical pump beam $O_{PMP}$. As an example, the net magnitude and direction of the local magnetic field $B_L$ can be based on the magnitude of the substantially uniform magnetic field $B_E$, the atomic density of the alkali metal 14, and the characteristics of the optical pump beam $O_{PMP}$, such as direction, magnitude, and wavelength (on or off resonance).

The NMR gyro system 50 also includes a probe beam source 54 that generates a probe beam $O_{PRB}$. In the example of FIG. 2, the probe beam $O_{PRB}$ passes through the NMR gyro cell 12 at a direction that is perpendicular to the direction of the substantially uniform magnetic field $B_E$. The probe beam $O_{PRB}$ exits the NMR gyro cell 12 as the detection beam $O_{DET}$. The alignment of the alkali metal 14 resulting from the optical pump beam $O_{PMP}$ can modulate the probe beam $O_{PRB}$ to generate the detection beam $O_{DET}$. Specifically, the spin-alignment and precession of the gyromagnetic isotopes 16 and 18 results in modulation of the precession of the alkali metal 14, which in turn modulates the optical probe beam $O_{PRB}$ to generate the optical detection beam $O_{DET}$, such that the modulation of the detection beam $O_{DET}$ corresponds to the precession of the gyromagnetic isotopes 16 and 18.

The optical detection beam $O_{DET}$ is provided to one or more photodetectors 56 in the angular rotation sensor 22. The photodetector(s) 56 is configured to detect and demodulate the optical detection beam $O_{DET}$. The photodetector(s) 56 is thus configured to generate a set of signals PRE that each correspond to the precession frequencies $\omega_A$ and $\omega_B$ of the respective gyromagnetic isotopes 16 and 18. As an example, the optical detection beam $O_{DET}$ can be demodulated and filtered to generate the signals PRE as separate functions, such as Bessel functions, that each has a period corresponding to a complete 360 degree rotation of the respective one of the gyromagnetic isotopes 16 and 18. The signals PRE are provided to a signal processor 58 that is configured to define the time duration of the measurement period and to measure precession angles $\theta_A$ and $\theta_B$ of the gyromagnetic isotopes 16 and 18 based on the respective signals PRE over the time duration.

The signal processor 58 can define measurable conditions of the signals PRE as measurement pulses that correspond to complete rotations or portions of a complete rotation of the respective gyromagnetic isotopes 16 and 18. For example, the signal processor 58 can be configured to set the measurement pulses as rising-edge zero crossings of each of the signals PRE, thus each measurement pulse can correspond to a complete 360 degree rotation of the respective one of the gyromagnetic isotopes 16 and 18. As another example, the signal processor 58 can be configured to set the measurement pulses as any zero crossing of each of the signals PRE, thus each measurement pulse can correspond to a 180 degree rotation of the respective one of the gyromagnetic isotopes 16 and 18. As yet another example, the signal processor 58 can be configured to set the measurement pulses as any zero crossing or any zero value of a first derivative or integral of each of the signals PRE, thus each measurement pulse can correspond to a 90 degree rotation of the respective one of the gyromagnetic isotopes 16 and 18.

In the example of FIG. 2, the signal processor 58 includes the magnetic field error controller 26 that is configured to generate the error signal ERR. Similar to as described above in the example of FIG. 1, the error signal ERR is provided as a feedback signal to the magnetic field generator 20 to maintain the substantially uniform magnetic field $B_E$ at a desired magnitude. For example, one of the local oscillator signals LO can correspond to an expected frequency of the sum of the precession frequencies of the gyromagnetic isotopes 16 and 18 in the presence of the substantially uniform magnetic field $B_E$. The magnetic field error controller 26 can thus be configured to compare a sum of the precession frequencies of the gyromagnetic isotopes 16 and 18, as measured by the signal processor 58 based on the signals PRE, with a reference frequency defined by the local oscillator signal LO. The difference in frequency between the sum of the precession frequencies of the gyromagnetic isotopes 16 and 18 and the reference frequency thus corresponds to error in the substantially uniform magnetic field $B_E$. Accordingly, the error signal ERR is provided to the magnetic field generator 20 to adjust the magnitude of the substantially uniform magnetic field $B_E$ based on the error signal ERR to compensate for the detected field error.

The precession angle of one of the gyromagnetic isotopes 16 and 18, demonstrated in the example of FIG. 2 as $\theta_{ISO}$, is provided to the mechanization processor 24. As an example, the precession angle $\theta_{ISO}$ can correspond to the slowest precessing one of the gyromagnetic isotopes 16 and 18. The mechanization processor 24 can thus calculate the rotation angle $\theta_G$ of the NMR gyro system 50 about the sensitive axis 51 based on the measured precession angle $\theta_{ISO}$. In addition, the error signal ERR is likewise provided to the mechanization processor 24, such that the mechanization processor 24 can compensate for the error in the magnitude of the substantially uniform magnetic field $B_E$ in calculating the rotation angle $\theta_G$. As an example, the error signal ERR can represent phase error information associated with one or both of the first and second gyromagnetic isotopes 16 and 18. Therefore, the mechanization processor 24 can subtract the known phase angle error in one of the gyromagnetic isotopes 16 and 18 from the apparent rotation angle of the NMR gyro system 50.

As an example, the error signal ERR can be configured as an error voltage having a magnitude that is linearly proportional to a phase difference between the sum of the precession frequencies of the gyromagnetic isotopes 16 and 18 and the reference frequency represented by the local oscillator signal LO. The error voltage can be updated at a frequency that is approximately the same as the reference frequency represented by the local oscillator signal LO. Specifically, the magnitude of the error voltage can represent each phase difference sample integrated over time, or can represent an average of each phase difference sample over time. Thus, the error voltage can be provided as a voltage control signal to the magnetic field generator 20, such as to adjust a DC component of the voltage through an associated solenoid, and can be implemented by the mechanization processor 24 for substantially immediate compensation of the gyro angle $\theta_G$ due to the error in the magnitude of the substantially uniform magnetic field $B_E$.

As another example, in the example of FIG. 2, the error signal ERR can represent a first signal provided to the magnetic field generator 20, such as the error voltage described above, and a separate second signal provided to the mechanization processor 24. For example, the error signal ERR can be provided to the mechanization processor 24 as a digital signal corresponding to information regarding the phase difference between the sum of the precession frequencies of the gyromagnetic isotopes 16 and 18 and the reference frequency represented by the local oscillator signal LO. Specifically, as described above, the mechanization processor 24 can calculate the rotation angle $\theta_G$ of the NMR gyro system 50 based on each precession angle sample of one of the precessing gyromagnetic isotopes 16 and 18. The magnetic field error controller 26, on the other hand, can calculate samples of the phase difference between the sum of the precession frequencies of the gyromagnetic isotopes 16 and 18 and the reference frequency at a frequency of the local oscillator signal LO, which is thus greater than the precession frequency of either of the precession frequencies of the gyromagnetic isotopes 16 and 18. Therefore, the error signal ERR provided to the mechanization processor 24 can be configured as a set of averaged phase difference samples corresponding to each precession angle sample of either of the precession frequencies of the gyromagnetic isotopes 16 and 18. Accordingly, the mechanization processor 24 can subtract the average phase difference represented by the error signal ERR from each precession angle sample of either of the precession frequencies of the gyromagnetic isotopes 16 and 18 to calculate the rotation angle $\theta_G$ of the NMR gyro system 50.

Based on the error compensation provided by the magnetic field error controller 26, the mechanization processor 24 can provide a more accurate rotation angle measurement of the NMR gyro system 50 than typical gyroscope systems. It is to be understood that the NMR gyro system 50 is not limited to the example of FIG. 2. Specifically, the NMR gyro system 50 is demonstrated simplistically, in that additional components can be included in the angular rotation sensor 22. As an example, the angular rotation sensor 22 can also include a magnetic field generator that provides an additional magnetic field transverse to the sensitive axis 51 to cooperate with the optical pump beam $O_{PMP}$ in aligning the alkali metal particles 14 to the gyromagnetic isotopes 16 and 18. Furthermore, the NMR gyro system 50 can include other arrangements of the optical signal sources. As an example, the optical pump beam $O_{PMP}$ can also be implemented to generate the optical detection signal $O_{DET}$, such as based on the optical pump beam $O_{PMP}$ being implemented as a single collimated beam that is provided to the NMR gyro cell at a specific angle (e.g., 45° relative to the rotational axis). Thus, the single collimated beam can result in separate normal components within the NMR gyro cell 12 that both pump the alkali metal 14 and generate the optical detection beam $O_{DET}$. Accordingly, the NMR gyro system 50 can be configured in any of a variety of ways.

Figure 3:
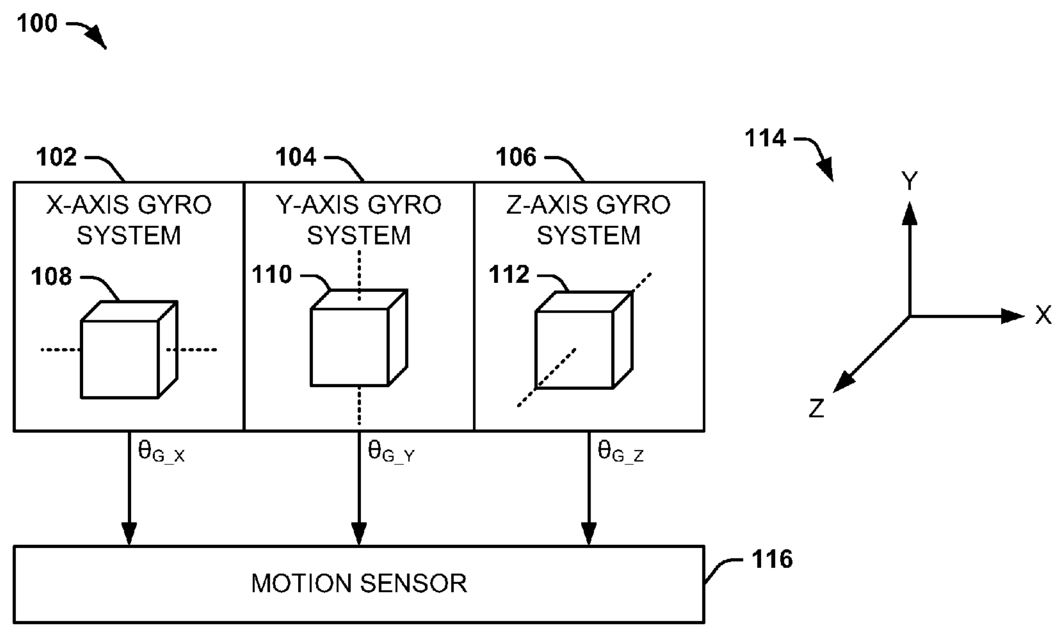
FIG. 3 illustrates an example of a three-axis gyro system in accordance with an aspect of the invention.

FIG. 3 illustrates an example of a three-axis gyro system 100 in accordance with an aspect of the invention. As an example, the three-axis gyro system 100 can be implemented in any of a variety of navigation control systems, such as for aircraft and/or spacecraft, or device to monitor yaw, pitch, and roll rotational motion information.

The three-axis gyro system 100 includes an X-axis gyro system 102, a Y-axis gyro system 104, and a Z-axis gyro system 106. As an example, each of the X-axis, Y-axis, and Z-axis gyro systems 102, 104, and 106 can be configured substantially similar to the NMR gyro system 50 in the example of FIG. 2. In the example of FIG. 3, the X-axis gyro system 102 can have a sensitive axis about the X-axis, the Y-axis gyro system 104 can have a sensitive axis about the Y-axis, and the Z-axis gyro system 106 can have a sensitive axis about the Z-axis. The axes of rotation of the respective NMR gyro cells 108, 110, and 112 are indicated in the example of FIG. 3 by a Cartesian coordinate system 114. Thus, each of X-axis, Y-axis, and Z-axis gyro systems 102, 104, and 106 can implement magnetic field error compensation, such as described above. Specifically, each of X-axis, Y-axis, and Z-axis gyro systems 102, 104, and 106 can utilize an error signal associated with magnetic field error to correct respective rotation angles $\theta_{G\_X}$, $\theta_{G\_Y}$, and $\theta_{G\_Z}$ associated with rotation of respective NMR gyro systems. Accordingly, the three-axis gyro system 100 can more accurately measure rotational motion about all three of the sensitive axes demonstrated by the X-axis, Y-axis, and Z-axis gyro systems 102, 104, and 106 based on the magnetic field error compensation.

In the example of FIG. 3, each of the X-axis, Y-axis, and Z-axis gyro systems 102, 104, and 106 are demonstrated as outputting signals that include the respective rotation angles $\theta_{G\_X}$, $\theta_{G\_Y}$, and $\theta_{G\_Z}$ to a motion sensor 116. The motion sensor 116 can thus be configured to determine an aggregate three-axis rotational motion of the associated vehicle or device that includes the three-axis gyro system 100. Therefore, the yaw, pitch, and roll of the associated vehicle or device that includes the three-axis gyro system 100 can be determined. Accordingly, the motion sensor 116 can be configured to display, output, and/or report the three-axis rotational motion of the associated vehicle or device that includes the three-axis gyro system 100.

Figure 4:
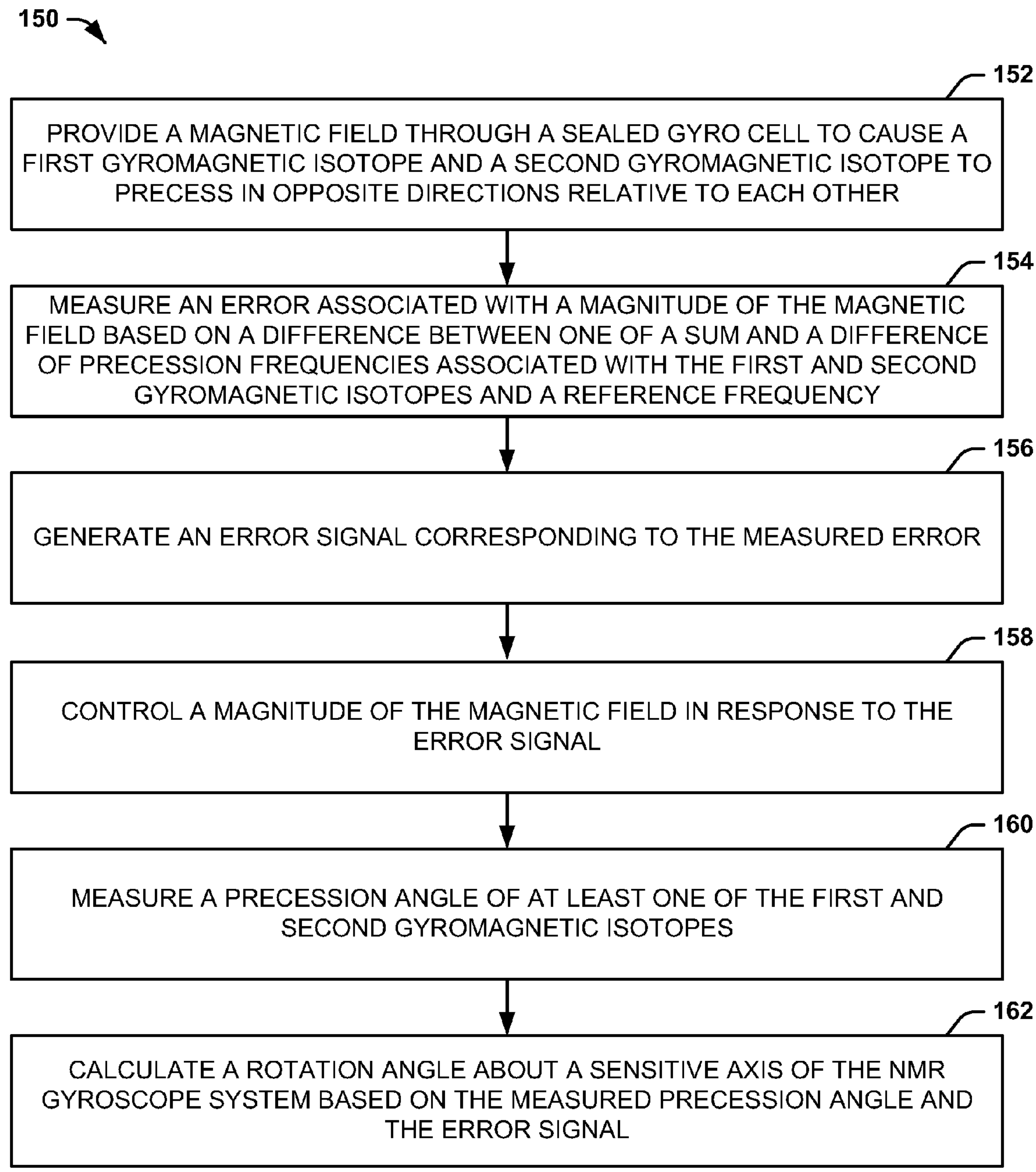
FIG. 4 illustrates an example of a method for substantially reducing magnetic field errors in an NMR gyro system in accordance with an aspect of the invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 150 for substantially reducing magnetic field errors in an NMR gyro system. At 152, a magnetic field is provided through a sealed gyro cell to cause a first gyromagnetic isotope and a second gyromagnetic isotope to precess. The gyromagnetic isotopes can be any of a variety of gyromagnetic isotopes, such as $^{129}$Xenon and $^{131}$Xenon. The magnetic field can be a substantially uniform magnetic field, such as generated by a solenoid that substantially surrounds the sealed gyro cell. At 154, an error associated with a magnitude of the magnetic field is measured based on a difference between a sum or difference of frequencies associated with the precession of the first and second gyromagnetic isotopes and a reference frequency. The reference frequency can be generated by a local oscillator, such as a crystal oscillator, and can represent a desired frequency of the sum of precession frequencies associated with the first and second gyromagnetic isotopes in the presence of the magnetic field.

At 156, an error signal corresponding to the measured error is generated. The error signal can be an error voltage having a magnitude that is linearly proportional to a phase difference between the sum of precession frequencies associated with the first and second gyromagnetic isotopes and the reference frequency. The error signal can alternatively correspond to an average of phase difference samples corresponding to each precession angle sample of either of the precession frequencies of the first and second gyromagnetic isotopes. At 158, a magnitude of the magnetic field is controlled in response to the error signal. At 160, a precession angle of at least one of the first and second gyromagnetic isotopes is measured. The measurement can be of the slowest precessing one of the gyromagnetic isotopes. At 162, a rotation angle about a sensitive axis of the NMR gyroscope system is calculated based on the measured precession angle and the error signal. The calculation can be performed by a mechanization processor that subtracts the measured error from either the measured precession angle of one of the first and second gyromagnetic isotopes or from the rotation angle of the gyro cell.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A nuclear magnetic resonance (NMR) gyroscope system comprising:

a gyro cell that is sealed to enclose an alkali metal vapor, a first gyromagnetic isotope, and a second gyromagnetic isotope;

a magnetic field generator configured to generate a magnetic field that is provided through the gyro cell to cause the first and the second gyromagnetic isotopes to precess;

a magnetic field error controller configured to measure an error associated with a magnitude of the magnetic field and to generate an error signal that is fed back to the magnetic field generator to maintain the magnetic field at a desired magnitude; and a mechanization processor configured to calculate a rotation angle about a sensitive axis of the NMR gyroscope system based on a measured precession angle of at least one of the first and second gyromagnetic isotopes and the error signal.

2. The nuclear magnetic resonance (NMR) gyroscope system of claim 1, wherein the magnetic field error controller is configured to measure the error based on a difference between one of a sum and a difference of precession frequencies associated with the first and second gyromagnetic isotopes and a reference frequency.

3. The nuclear magnetic resonance (NMR) gyroscope system of claim 2, wherein the error signal is configured as an error voltage having a magnitude that is linearly associated with a phase difference between the one of the sum and the difference of the precession frequencies and the reference frequency.

4. The nuclear magnetic resonance (NMR) gyroscope system of claim 3, wherein the magnitude of the error voltage is updated at approximately the reference frequency.

5. The nuclear magnetic resonance (NMR) gyroscope system of claim 3, wherein the error voltage corresponds to an average of phase difference samples, each phase difference sample corresponding to a phase difference between the one of the sum and the difference of the precession frequencies and the reference frequency measured at the reference frequency.

6. The nuclear magnetic resonance (NMR) gyroscope system of claim 1, wherein the mechanization processor is configured to subtract an error angle represented by the error signal from the measured rotation angle about the sensitive axis of the NMR gyroscope system.

7. The nuclear magnetic resonance (NMR) gyroscope system of claim 1, further comprising a signal processor configured to measure the precession angle of one of the first and second gyromagnetic isotopes, the mechanization processor calculating the rotation angle about the sensitive axis of the NMR gyroscope system based on the precession angle of the one of the first and second gyromagnetic isotopes.

8. The nuclear magnetic resonance (NMR) gyroscope system of claim 7, wherein the magnetic field error controller is configured to compare a phase associated with one of a sum and a difference of precession frequencies associated with the first and second gyromagnetic isotopes and a reference frequency to generate phase difference samples at a frequency that is proportional to the reference frequency to measure the error associated with a magnitude of the magnetic field.

9. The nuclear magnetic resonance (NMR) gyroscope system of claim 8, wherein the magnetic field error controller is configured to calculate an average error associated with a plurality of phase difference samples corresponding to each sample of the precession angle of the one of the first and second gyromagnetic isotopes, wherein the mechanization processor is configured to subtract the average error from the measured precession angle of the one of the first and second gyromagnetic isotopes to calculate the rotation angle about the sensitive axis of the NMR gyroscope system.

10. A three-axis gyroscope system comprising the NMR gyroscope system of claim 1.

11. A non-transitory computer-readable medium having instructions executable by at least one processor to implement a method for substantially reducing magnetic field errors in a nuclear magnetic resonance (NMR) gyroscope system, the method comprising:

controlling a magnitude of a magnetic field through a sealed gyro cell in response to an error signal to cause a first gyromagnetic isotope and a second gyromagnetic isotope to precess in opposite directions relative to each other;

measuring an error associated with the magnitude of the magnetic field based on a difference between one of a sum and a difference of precession frequencies associated with the first and second gyromagnetic isotopes and a reference frequency;

generating the error signal corresponding to the measured error;

measuring a precession angle of at least one of the first and second gyromagnetic isotopes; and calculating a rotation angle about a sensitive axis of the NMR gyroscope system based on the measured precession angle and the error signal.

12. The non-transitory computer-readable medium of claim 11, wherein generating the error signal comprises generating an error voltage having a magnitude that is linearly associated with a phase difference between the one of the sum and the difference of the precession frequencies and the reference frequency.

13. The non-transitory computer-readable medium of claim 12, further comprising updating a magnitude of the error voltage at a rate that is proportional to the reference frequency.

14. The non-transitory computer-readable medium of claim 12, further comprising generating a magnitude of the error voltage as an average of phase difference samples, each phase difference sample corresponding to a phase difference between the one of the sum and the difference of the precession frequencies and the reference frequency measured at the reference frequency.

15. The non-transitory computer-readable medium of claim 11, wherein calculating the rotation angle comprises subtracting from the measured rotation angle about the sensitive axis of the NMR gyroscope system an error angle represented by the error signal.

16. The non-transitory computer-readable medium of claim 11, wherein measuring the precession angle of the at least one of the first and second gyromagnetic isotopes comprises measuring the precession angle of one of the first and second gyromagnetic isotopes, and wherein calculating the rotation angle comprises calculating the rotation angle about the sensitive axis of the NMR gyroscope system based on the precession angle of the one of the first and second gyromagnetic isotopes.

17. The non-transitory computer-readable medium of claim 16, further comprising:

generating phase difference samples at a frequency that is proportional to the reference frequency to measure the error associated with a magnitude of the magnetic field;

calculating an average error associated with a plurality of phase difference samples corresponding to each sample of the precession angle of the one of the first and second gyromagnetic isotopes; and subtracting the average error from the measured precession angle of the one of the first and second gyromagnetic isotopes to calculate the rotation angle about the sensitive axis of the NMR gyroscope system.

18. A three-axis nuclear magnetic resonance (NMR) gyroscope system comprising a plurality of gyro cell systems, each of the gyro cell systems comprising:

a gyro cell that is sealed to enclose an alkali metal vapor, a first gyromagnetic isotope, and a second gyromagnetic isotope;

a magnetic field generator configured to generate a magnetic field that is provided through the gyro cell to cause the first and the second gyromagnetic isotopes to precess;

a magnetic field error controller configured to measure an error associated with a magnitude of the magnetic field based on a difference between one of a sum and a difference of precession frequencies associated with the first and second gyromagnetic isotopes and a reference frequency and to generate an error signal that is fed back to the magnetic field generator to maintain the magnetic field at a desired magnitude; and a mechanization processor configured to calculate a rotation angle about a sensitive axis of the NMR gyroscope system based on subtracting from a measured precession angle of at least one of the first and second gyromagnetic isotopes an error angle represented by the error signal.

19. The three-axis nuclear magnetic resonance (NMR) gyroscope system of claim 18, wherein the error signal is configured as an error voltage having a magnitude corresponds to an average of phase difference samples, each phase difference sample corresponding to a phase difference between the one of the sum and the difference of the precession frequencies and the reference frequency measured at the reference frequency.

20. The three-axis nuclear magnetic resonance (NMR) gyroscope system of claim 18, further comprising a signal processor configured to measure precession angle samples of one of the first and second gyromagnetic isotopes, wherein the magnetic field error controller is configured to calculate an average error associated with a plurality of phase difference samples corresponding to each sample of the one of the sum and the difference of precession frequencies associated with the first and second gyromagnetic isotopes and the reference frequency, and wherein the mechanization processor is configured to subtract the average error from the each precession angle sample to calculate the rotation angle about the sensitive axis of the NMR gyroscope system.

* * * * *